(12) United States Patent
Pasion et al.

(10) Patent No.: US 9,864,866 B2
(45) Date of Patent: Jan. 9, 2018

(54) DYNAMICALLY CONFIGURABLE ONLINE DATA UPDATE SYSTEM

(71) Applicant: General Instrument Corporation, Horsham, PA (US)

(72) Inventors: Jason A. Pasion, San Diego, CA (US); Zeya Myint, San Diego, CA (US); Xin Qiu, San Diego, CA (US); Fan Wang, San Diego, CA (US); Joel Yan, San Diego, CA (US); Ting Yao, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 1 day.

(21) Appl. No.: 14/028,507

(22) Filed: Sep. 16, 2013

(65) Prior Publication Data
US 2014/0082701 A1  Mar. 20, 2014

Related U.S. Application Data (60) Provisional application No. 61/702,203, filed on Sep. 17, 2012, provisional application No. 61/798,662, filed on Mar. 15, 2013.

(51) Int. Cl.
*H04L 29/06* (2006.01)
*G06F 21/60* (2013.01)
(Continued)

(52) U.S. Cl.
CPC ............ *G06F 21/606* (2013.01); *G06F 21/10* (2013.01); *H04L 63/062* (2013.01);
(Continued)

(58) Field of Classification Search
CPC ............ H04L 41/0803; H04L 41/0806; H04L 41/0813; H04L 47/762; H04L 9/006; H04L 9/083; H04L 9/3263; H04L 9/3268; H04L 63/06; H04L 63/062; H04L 63/08; H04L 63/0823; H04L 63/101; G06F 8/65; G06F 21/10; G06F 21/606
(Continued)

(56) References Cited

U.S. PATENT DOCUMENTS

7,720,918 B1 * 5/2010 Martin .................. G06Q 30/00
                                                              709/206
8,050,242 B2 * 11/2011 Lipford et al. ............... 370/338
(Continued)

*Primary Examiner* — Minh Dinh
(74) *Attorney, Agent, or Firm* — Thomas A. Ward (57) ABSTRACT

A data object update system provides a flexible framework that can be used to upgrade, renew, replace or supplement data objects that are provisioned in a large base of network-enabled devices that been deployed in the field to end users. The system has the flexibility to configure, for example, the following items, based on different requirements received from network operators: which device key and/or certificate is to be used to authenticate request messages from network-enabled devices before a specific data object update request is accepted into the system; which device identifier is to be used to authorize data object update requests; which device identifier is to be used for generating device specific data objects; and which protection mechanism is to be used to secure the delivery of data objects to network-enabled devices.

10 Claims, 11 Drawing Sheets

(51) Int. Cl.
  *G06F 21/10* (2013.01)
  *H04L 29/08* (2006.01)
  *H04L 9/32* (2006.01)

(52) U.S. Cl.
  CPC ........ *H04L 63/0823* (2013.01); *H04L 63/101* (2013.01); *H04L 67/303* (2013.01); *H04L 9/3268* (2013.01)

(58) Field of Classification Search
  USPC ........................................................... 726/4
  See application file for complete search history.

(56) References Cited

U.S. PATENT DOCUMENTS

| | | | |
|---|---|---|---|
| 8,484,355 B1* | 7/2013 | Lochhead et al. ............ 709/226 | |
| 2008/0209491 A1* | 8/2008 | Hasek ................ H04N 7/17318 | 725/114 |
| 2011/0113239 A1* | 5/2011 | Fu ...................... H04L 63/0823 | 713/156 |
| 2011/0138177 A1* | 6/2011 | Qiu et al. ...................... 713/168 | |
| 2011/0258454 A1 | 10/2011 | Qiu et al. | |
| 2011/0258685 A1 | 10/2011 | Qiu et al. | |
| 2012/0071152 A1* | 3/2012 | Roundtree et al. ............ 455/419 | |
| 2012/0089839 A1* | 4/2012 | Qiu ........................ H04L 9/006 | 713/171 |
| 2013/0174241 A1* | 7/2013 | Cha .................... H04L 63/0815 | 726/7 |
| 2013/0347025 A1* | 12/2013 | Prakash ............. H04N 21/2541 | 725/25 |
| 2014/0380053 A1* | 12/2014 | Libonate et al. ............. 713/170 | |

* cited by examiner

FIG. 3  Operator/ID Creation

FIG. 4  Example of DObject Creation and Parameter Configuration

FIG. 5  Example of Operation Configuration Controller

600

```
Operator / PKI Type Form                                    [_][□][X]

2) Downloadable
Operator / PKI Type   [7 : ALIANT, (6) / IPTV_Sigma_Chip, (230)]  Object Type 1) Network    Operator Id  [ALIANT, (6)        ▼]   PKi Type Id [IPTV_8634_Sigma_Chip (230)]
Operator
              Certificate Info                      PKi Type Info
              ┌──────────────────────────┐          ┌──────────────────────────────────┐
              │ Operator , ALIANT        │          │ PKI Type ID : 230                │
              │ Operator ID , 6          │          │ Address Type : MAC               │
              │ Status : True            │          │ Private Data Size : 2496         │
              │                          │          │ PKI Type Name : IPTV_8634_Sigma_Chip│
DObject Delivery Status    ● True  ○ False          │ Offset To Private Data : 4052    │
Parameters                                          │ PKI Type Description :           │
              Max Request Number [2000000]          │ IPTV_8634_sigma_Chip             │
                                                    │ Address used Per Record : 1      │
                                                    └──────────────────────────────────┘

Expiration Date Time [10/20/2013 12:00:00 PM ▼]  Inserted Date Time [11/29/2011 11:52:03 PM]

3) Operation  Config Id [2                       ▼]  Modified Date Time [2/22/2012 5:23:46 PM]
Configuration
Controller    Config Info
              ┌───────────────────────────────────────────────────────────────────────┐
              │  ••• Configuration Id : 2 •••                                         │
              │ Has White List : True                                                 │
              │ Has Black List : True                                                 │
              │ Is Next Available : False                                             │
              │ Has Post Binding : False                                              │
              │ Has Deviced Id : True                                                 │
              │ Inserted Date Time : 11/29/2011 11:52:03 PM                           │
              │ Modified Date Time : 11/29/2011 11:52:03 PM                           │
              │                                                                       │
              │  ••• Auth Type : CertBased •••                                        │
              │ Certificate Id : 4                                                    │
              │    Subject : CN = Sub-CA 1 OU = Broadband Devices Device PKI O = Motorola, Inc. C = US │
              │    Issuer : CN = Broadband Device Root Certificate Authority, OU = Broadband Devices │
              │    Device PKI, o = Motorola, Inc. C = US                              │
              │    Expiration Time : 12/29/2025 12:52:31 PM                           │
              │                                                                       │
              │  ••• Key Agreement Type : DHBased •••                                 │
              │ DH ID : 1                                                             │
              │    Size : 256                                                         │
              │    Description : IPTV_8634_Sigma_Chip (PKI type 230)                  │
              │                                                                       │
              └───────────────────────────────────────────────────────────────────────┘

[ Update ]                               [ Close ]
```

FIG. 6   Example of Operation Configuration Controller

FIG. 7

FIG. 8 Session Manager

FIG. 9 ODUS Server Main Components and Message Flow

FIG. 10 An Example of Authenticator Instance

FIG. 11 An Example of Authentorizer Workflow with Whitelist

FIG. 12  DH - based Encryptor Workflow

DYNAMICALLY CONFIGURABLE ONLINE DATA UPDATE SYSTEM

BACKGROUND

Security and privacy represent important issues in modern communications when network-enabled devices such as mobile phones, personal computers, routers, set-top boxes and the like communicate over fixed or wireless networks. There are a number of scenarios where a network-enabled device is to be provisioned with sensitive material from a remote update server. Such sensitive material, referred to herein as downloadable data objects, may include, by way of example, device specific digital identity data, configuration information and device entitlements.

Device specific digital identity data typically consists of a set of cryptographic keys and, if public key cryptography is used, their associated digital certificates. Configuration information generally includes a set of parameters that a network operator requires network-enabled devices to use when operating in their network. For example, a cable network operator may require parameters pertaining to timeouts, the number of retries that are allowed and the channel map that is used to be downloaded to set top boxes used in their networks. Device entitlements may be, for instance, a license which a network operator requires network-enabled devices to possess in order to perform certain functions, access resources, and provide features. For example, a mobile device can have both CDMA and GSM capabilities, but the network operator may require a license to be downloaded to the device before it is able to roam in both types of networks.

For various security, operational, and system upgrade reasons, new downloadable data objects may periodically need to be delivered to these devices. The manner in which the data objects are delivered may depend on a number of factors. For instance, the downloadable data objects may be protected by previously installed digital identity data previously. Some network-enabled devices may already have been personalized with digital identity data at the factory before being distributed to customers. However, for devices with unusable identity data or without initially installed identity data, other protection mechanisms may need to be used.

Systems for downloading data objects exist which allow new or replacement downloadable data objects to be securely delivered and installed in network-enabled devices that are deployed and managed by different network operators without having to recall the devices to service centers.

DETAILED DESCRIPTION

A data object update system is described herein which provides a flexible framework that can be used to upgrade, renew, replace or supplement data objects that are provisioned in a large base of network-enabled devices that have already been deployed in the field. The system architecture allows network operators to install and update the data objects in these devices without having to recall them from the end-user. If the downloadable object is identity data that involves digital certificates, the system architecture may allow operators to update expired or expiring certificates provisioned in previously deployed network-enabled devices with minimum service disruption. In a common scenario, for instance, a network operator may have acquired, say, 500,000 units of a product that they have delivered to their end user customers. For one reason or another the network operator may wish to update the identity data in all or a subset (e.g., 100,000) of those units. In one particular instance the identity data is Public Key Infrastructure (PKI) data. In other cases the identity data may take a variety of other forms such as a serial number, a symmetric key that is cryptographic based, and the like.

Due to the operational complexities and various functional requirements for downloading data objects from the system over a network such as the Internet, supporting a new data object type or network operator conventionally requires new implementations of the system software. After the implementation has been completed, the software will need to be redeployed, requiring down time to be scheduled with the existing network operators who already have devices in production. However, requests for new or updated data objects can be sent to the system at any time and the network operators would expect minimum (or no) downtime with high-availability to support these requests. For the reasons noted above, conventional data object update systems may have difficulty meeting these expectations.

To address the aforementioned problems, the data object update system discussed below has the flexibility to configure, for example, the following items, based on different requirements received from network operators:

Which device key and/or certificate is to be used to authenticate request messages from network-enabled devices before a specific data object update request is accepted into the system;

Which device identifier is to be used to authorize data object update requests;

Which device identifier is to be used for generating device specific data objects;

Which protection mechanism is to be used to secure the delivery of data objects to network-enabled devices;

How many times a device can download a data object of a particular type; and

When to stop permitting network-enabled device to download data objects of a particular type.

Figure 1:
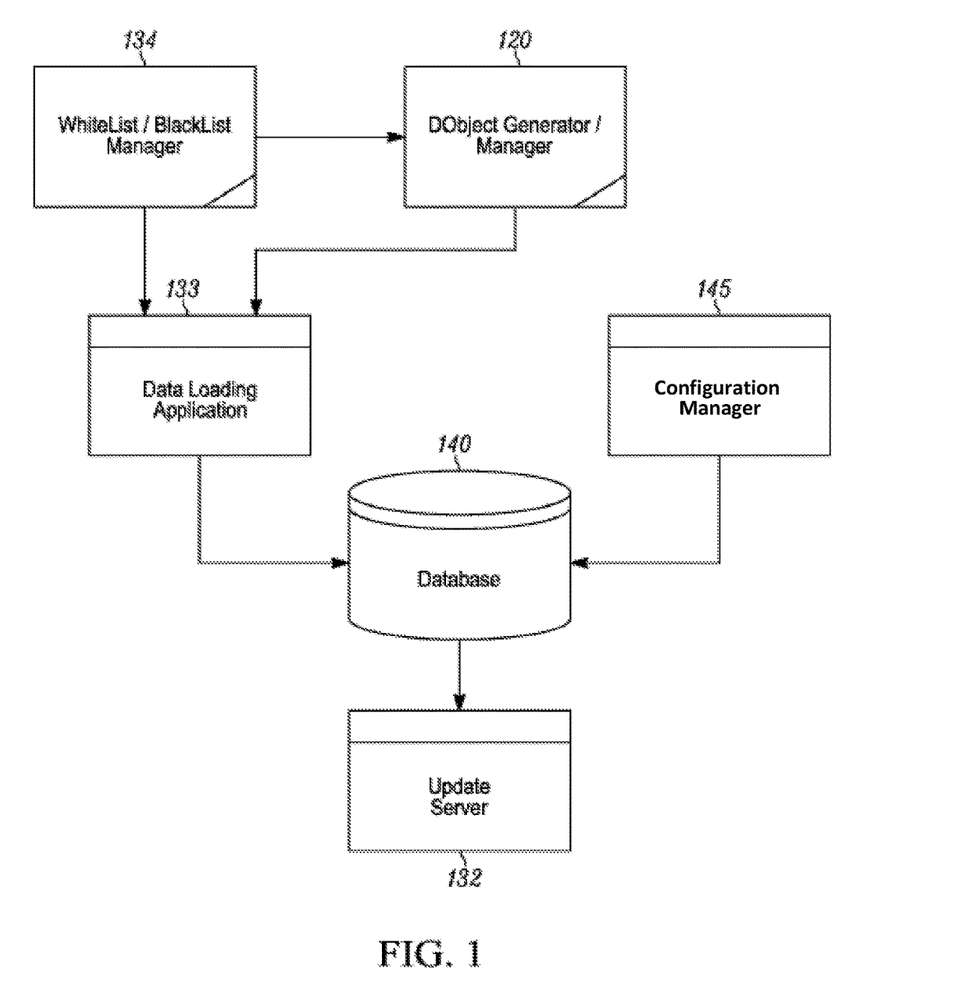
FIG. 1 shows one example of an operating environment in which the processes described herein for provisioning network-enabled device with downloadable data objects may be implemented.

FIG. 1 shows one example of an operating environment in which the processes described herein for provisioning network-enabled device with downloadable data objects may be implemented. The operating environment includes data object generation system 120, whitelist/blacklist manager 134, data loading application 133, update server 132, configuration manager 145, database 140 and deployed network-enabled devices 240.

The data object generation system 120, which for security reasons may be in some cases an offline system, generates the data objects that are to be provisioned in the network-enabled devices. If, for instance, the data objects include digital certificates, the data object generation system 120 may include order fulfillment processors (not shown), which may include, or have access to, hardware security modules (HSMs) in which the certificate authority's (CA's) certificate signing private keys and secure data may be stored for use by the system. The update server 132 receives new downloadable objects from the offline data object generation system 120 and securely downloads the new data objects to the appropriate deployed network-enabled devices 240. The whitelist/blacklist manager 134 consolidates various identities received from different whitelist and/or blacklist sources. These identifiers and other data allow the whitelist/blacklist manager 134 to manage the downloadable data objects by correlating the various identifiers that are assigned to the same network-enabled device.

The configuration manager 145, which is discussed in more detail below, is used by a system administrator to configure (e.g., add, modify, and delete) the database 140, which in turn drives the processing of a downloadable data object request by the update server 132. The data loading application 133 is in communication with the whitelist/blacklist manager 134 and the data object generation system 120. The data loading application 133 is used to load downloadable data objects and/or the authorization information associated therewith to the database 140.

Figure 2:
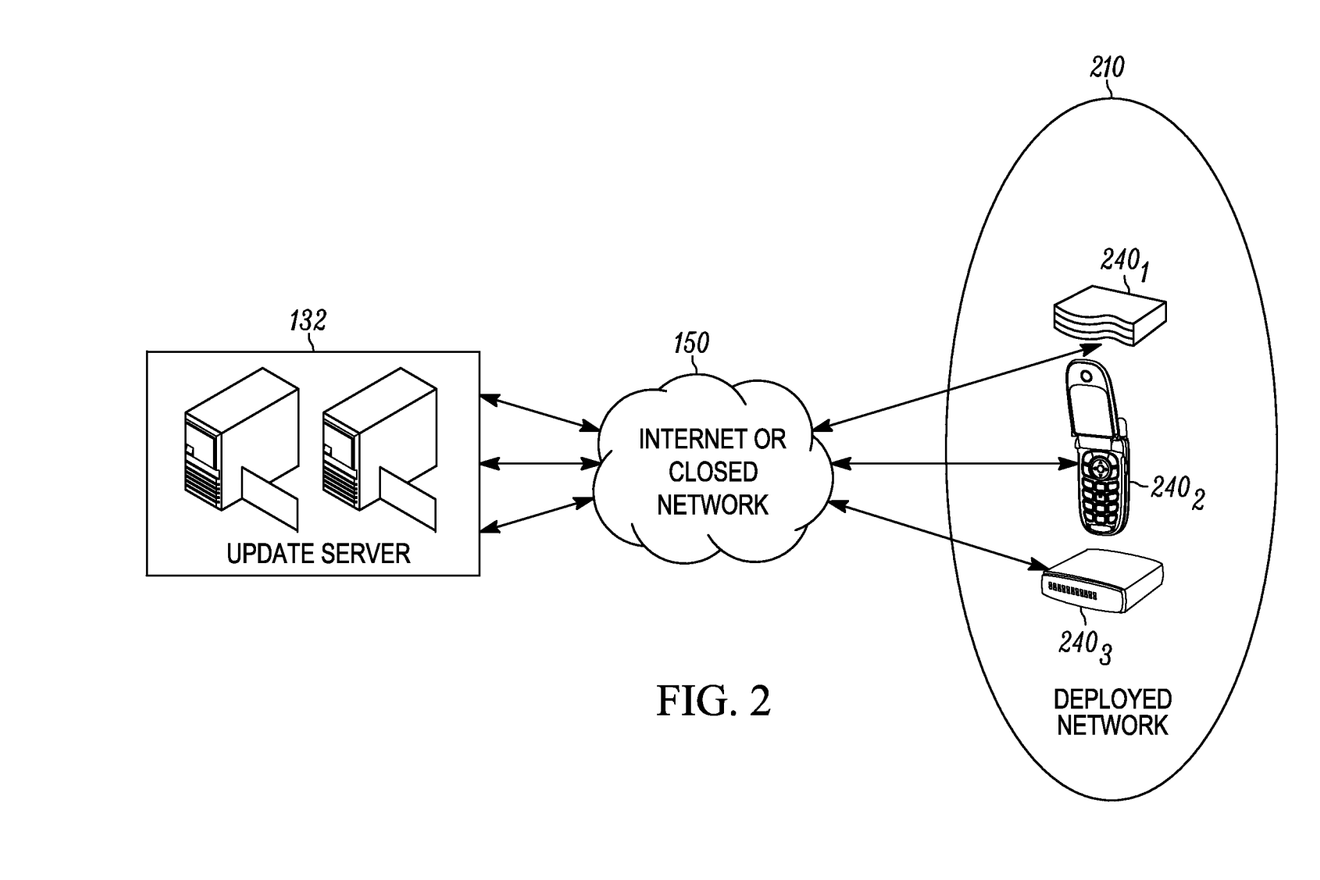
FIG. 2 shows the update server of FIG. 1 in communication with network-enabled devices which have been deployed in a network operated by a network operator over a public or private network.

FIG. 2 shows the update server 132 of FIG. 1 in communication with network-enabled devices $240_1$, $240_2$, and $240_3$ ("240") deployed in a network operated by a network operator over a public or private network 150 such as the Internet, for example. The update server 132 receives requests for data objects from the update server 132 over the network 150 and the update server 132, in turn, delivers the data objects to the network-enabled devices 240 over the network 150.

As previously mentioned, each time a new network operator or a new population (e.g., model, version) of network-enabled devices are to be provisioned with data objects by the update server 132, a new version of the system software may need to be released to support a specific use case and security requirements. The use of the configuration manager 145, however, avoids this problem by providing a set of configurable parameters/attributes which give the system the flexibility to meet the various network operators' security and operational requirements for downloading objects to network-enabled devices without impacting existing operations. That is, the system can be reconfigured to accommodate new network operators, new devices and new processes with little or no downtime.

Configurable Parameters

An illustrative and non-exhaustive set of configurable parameters/attributes are discussed below. Values for these parameters are supplied through the configuration manager UI for each new network operator and/or data object type that is to be supported by the data object update system. These parameters define how the system will process various data object download requests. The configurable parameters may include: a device identity parameter used to authorize a request, a parameter specifying an association between a network-enabled device and a downloadable data object, a parameter specifying an authentication mechanism to be used to authenticate a request, a parameter specifying an authorization mechanism to be used to authorize a request and a parameter specifying a protection mechanism to be used for securely delivering new downloadable data objects to the network-enabled devices. Each of these parameters will be discussed in turn.

The device identity is a set of data that uniquely identifies a network-enabled device within the system. In some cases, a unique device identifier (such as a MAC address, International Mobile Equipment Identity number or IMEI, Mobile Equipment Identifier or MEID, Motorola Unique Address or MUA, or device serial number) can be used as the device identity. When a unique device identifier is not available or not suitable for use, a set of attributes (such as an IP address, network operator, product name, model and/or version) related to the device may serve as the device identity. The device identity is used to associate a particular network-enabled device with a particular downloadable data object.

Downloadable data objects are generally associated with a specific network-enabled device or a group of devices based on a common feature such as a common product line, model and/or version. The association of a device with a data object is created either when the data object is generated or at the time the data object is requested by the network-enabled device. An association by generation is employed when a downloadable object is created for a specific device or a group of devices using a previously assigned device identifier(s). In this case the system requires a list of authorized devices and their identifiers before the downloadable data objects can be created. The association of the device identifier with its new data object is assigned by the data object generator 120 before the data object is uploaded to the update server 132 for later use. The information concerning this data object-to-device association may be stored in the database 140 as well the update server 132.

When receiving a request from a network-enabled device, the system retrieves the data object based on the device identifier and the data object association information. When there is a transmission error and/or a processing error on the part of the network-enabled device, subsequent requests for downloadable data objects may be sent to update server. In this case, the same data object will always be retrieved from the database for generating the response message. A data object associated by generation is considered to be "bound" to the network-enabled device.

Instead of establishing an association by generation, a data object may be associated with a network-enabled device by request. In an association by request, a downloadable object has no direct association with a device or a group of devices using the device identifier(s) previously assigned. Rather, the downloadable object is created for the network-enabled device using a new identifier internally assigned by the system. In this case, the system first generates a sufficient pool of new downloadable data objects and then uploads them to the update server for later use. The association with the device is created when a data object is requested by a device. Therefore, the association of the device identifier with its new data object takes place in the update server.

Three different types of association by request may be employed. First, when the initial request is received by the update server from a network-enabled device, the next available data object will be retrieved from the pool of the downloadable data objects which have been generated. The association of the data object and the device is then established at that time. Any subsequent requests for a downloadable data object from the same device will cause the same data object to be downloaded to the device. In other words, the data object is permanently bound to the network-enabled device after the first request is processed. This type of association is referred to herein as "post-binding."

Another type of association by request also occurs when the initial request is received by the update server from a device, and in response, the next available data object data is retrieved from the pool of downloadable data objects. However, in this case the association of the data object and the network-enabled device is made but the data object is not "bound" to the device. Therefore, any subsequent requests for a downloadable object from the same device will cause the next available data object to be retrieved from the database. This type of association is referred to herein as "no-binding."

Finally, a data object may not have any association with a device identifier or any product attributes. In this case, the update server simply returns a data object. Note that this type of association allows a null value of a product attribute/device ID to be used in the request message.

When one device needs multiple data objects of the same type and also needs an association, a sequence/index number may be introduced as one of the binding attributes along with the device identifier and the data object type. For association by generation, these three attributes (i.e. device identifier, data object type and sequence number) may be bound with a new data object data record during data generation. For the post-binding case, they will be bound with a "next available" data object record during the initial request so that any later request for the same attributes will result in the same data object record being provided to the network-enabled device.

Turning next to the parameter specifying the manner in which a request message from a network-enabled device is authenticated, the request can be authenticated based on the device key/certificate previously loaded at the factory or any other types of keys that are available to the device. In general the type of authentication that is used will depend on the cryptographic algorithms available in the device for message signature. The system can be configured to accept different signature algorithms (e.g., SHA1-1024RSA, SHA256-2048RSA, ECC as well as various symmetric key based algorithms). When a public key based algorithm is used, authentication of the request message's signature is performed against the trusted certificate chain under which the device certificate is issued. Both the signature algorithm and the specific trusted chain are configurable in the system. Any request that fails the authentication check will be rejected by the system.

The parameter specifying the manner in which a request message is authorized may indicate whether a white list or black list is to be used to ensure that only authorized devices form among all the authenticated device are allowed to be provisioned with new data objects. If no white or black list is provided, the system may allow all authenticated devices to download the requested data object.

The data objects downloaded by devices are encrypted by the system at the time of the request. Accordingly, the parameter specifying a protection mechanism to be used for securely delivering new downloadable data objects to the network-enabled devices may indicate the type of encryption that is to be employed. The type of encryption that is used will depend on the cryptographic algorithms available in the device for decryption. The most suitable algorithm for the network operator's use case will be selected from among those available to the device. The system can be configured to support, for example, either symmetric (e.g. AES) or asymmetric encryption (e.g. RSA) algorithms. The system may also be configured to use a key agreement protocol such as Diffie Hellman (DH), where a shared secret key is calculated to encrypt the data object. In this case, the system is configured with DH system parameters (base P and modulus G) as well as the symmetric key encryption algorithm that uses the DH shared secret key for data object encryption.

Configuration Manager User Interface

As previously mentioned, the configuration manager 145 is a graphical user interface (GUI) based application tool that allows a system administrator to configure (add, modify, and delete) various parameters in the system database 140, which in turn defines the system workflow when a request for a data object is received and processed. FIGS. 3-6 show various screen shots made available by the GUI. The screen shows show illustrative fields that are to be populated through the user interface.

Figure 3:
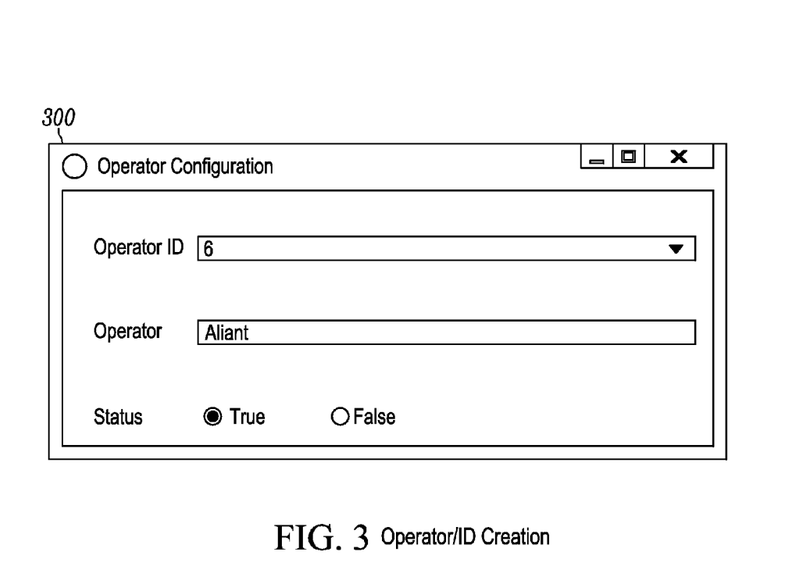
FIGS. 3-6 show screen shots of various user interface screens provided by the configuration manager shown in FIG. 1 through which values for various system parameters may be entered.

As shown in FIG. 3, an operator configuration screen 300 includes a network operator field, which is used to specify the name of the network operator of the network in which the network-enabled devices are deployed. If a network operator does not yet exist in the system database, the configuration manager may allow the system administrator to create one. The operator configuration screen also includes a network operator ID field, which allows a numerical number (ID) to be assigned to the network operator.

Figure 4:
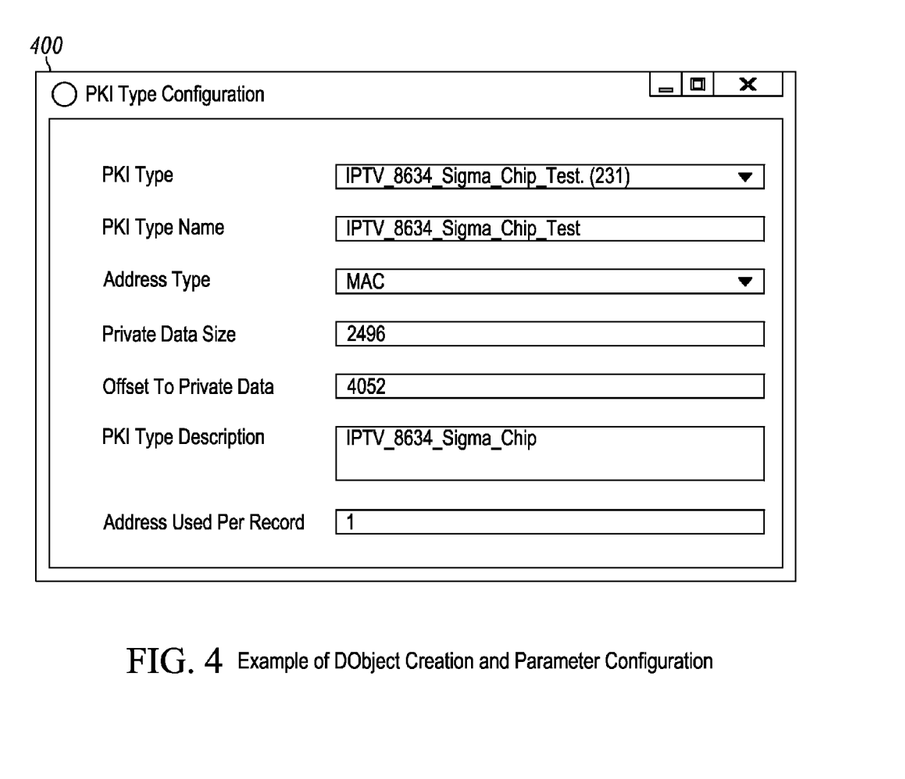

FIG. 4 shows a data object creation and parameter configuration screen 400 which includes fields that allow a user to specify the type of data object that is to be generated and related parameters. In this particular example, the downloadable data object type is PKI-based device identity data. Related fields allows specification of a name for the data object type, an IEEE MAC address which is associated with this particular PKI identity data type, a private data size and an offset to private data, which is used to indicate the location and data size of the private key data that will need to be encrypted.

Figure 5:
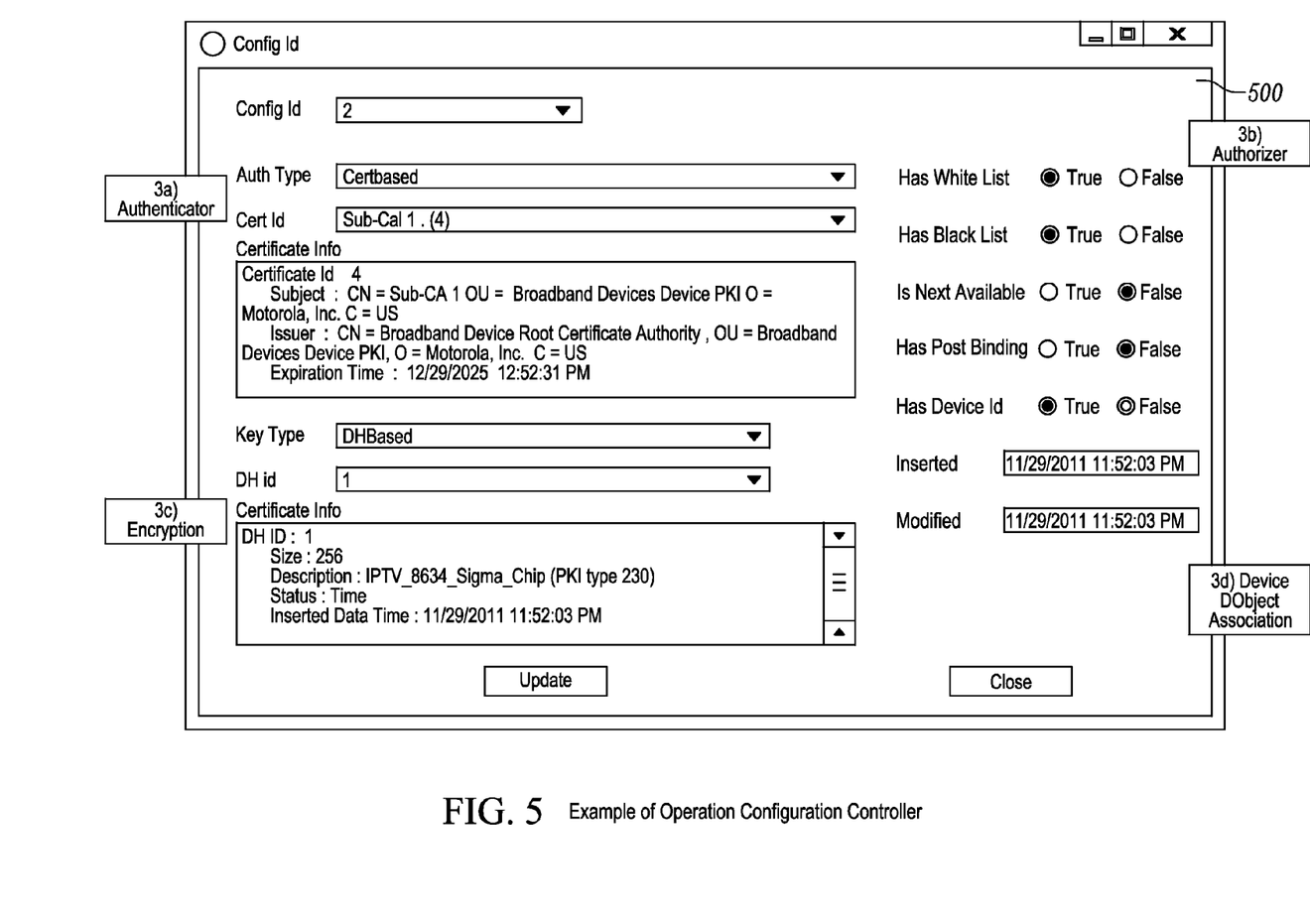

FIG. 5 shows an operation configuration control (OCC) screen 500, which is used to specify a configuration for the parameters associated with processing a request message. These parameters include parameters for authentication, authorization and encryption. The process configuration ID (shown as Config ID in FIG. 5) is used to select an identifier for a specific configuration of these parameters. The primary fields available on this screen are fields relating to authentication, authorization, encryption and the association between the downloadable data object and the network-enabled device.

In this example the authentication related fields include a field for specifying the authentication mechanism (shown in FIG. 5 as Auth Type). For purposes of illustration the authentication mechanism is shown to be PKI/certificate based, which means that a request message, when received by the update server, is expected to be signed by the device's private key with its corresponding certificate attached to the request message for the update server to verify. The device certificate can be verified by the update server under a Certificate Authority that is configurable in the system. In this example, the selected certificate ID is 4 with CN=Sub-CA 1 and OU=Broadband Device Device PKI. Any request that fails the authentication check will be rejected by the update server.

The authorization related fields allow the administrator to specify whether the authorization is to operate in accordance with a white or black list for this particular network operator and data object. A white list contains a list of device IDs which are allowed to request data objects and a black list contains a list of device IDs which are not permitted to download data objects of a particular type.

FIG. 5 also shows encryption related fields which allow the administrator to specify a type of protection to be used for the secure delivery of the data objects. In this example a Diffie Hellman (DH) based encryption mechanism is employed with the DH type being equal to 1. The DH type is used to differentiate different DH system parameters used for DH operations associated with various data object types.

Finally, FIG. 5 also allows the administrator to specify the type of association that is to be used between the network-enabled devices and the data objects. In this example association by generation ("Pre-Bound") is specified, where the device ID is tied with the data object at the time of generation. In this case, "Next Available" and "Has Post Binding" should both be set to "False." Other options that may be selected include association by request ("Post Bound"), which is used when a data object is bound to a particular device after it has been downloaded. If this option is selected both "Next Available" and "Has Post Binding" should be set to "True." The association by request ("Non Bound") option is to be selected if a data object is not to be bound to a device, in which case "Next Available" should set to be "True" and "Has Post Binding" set to "False."

Figure 6:
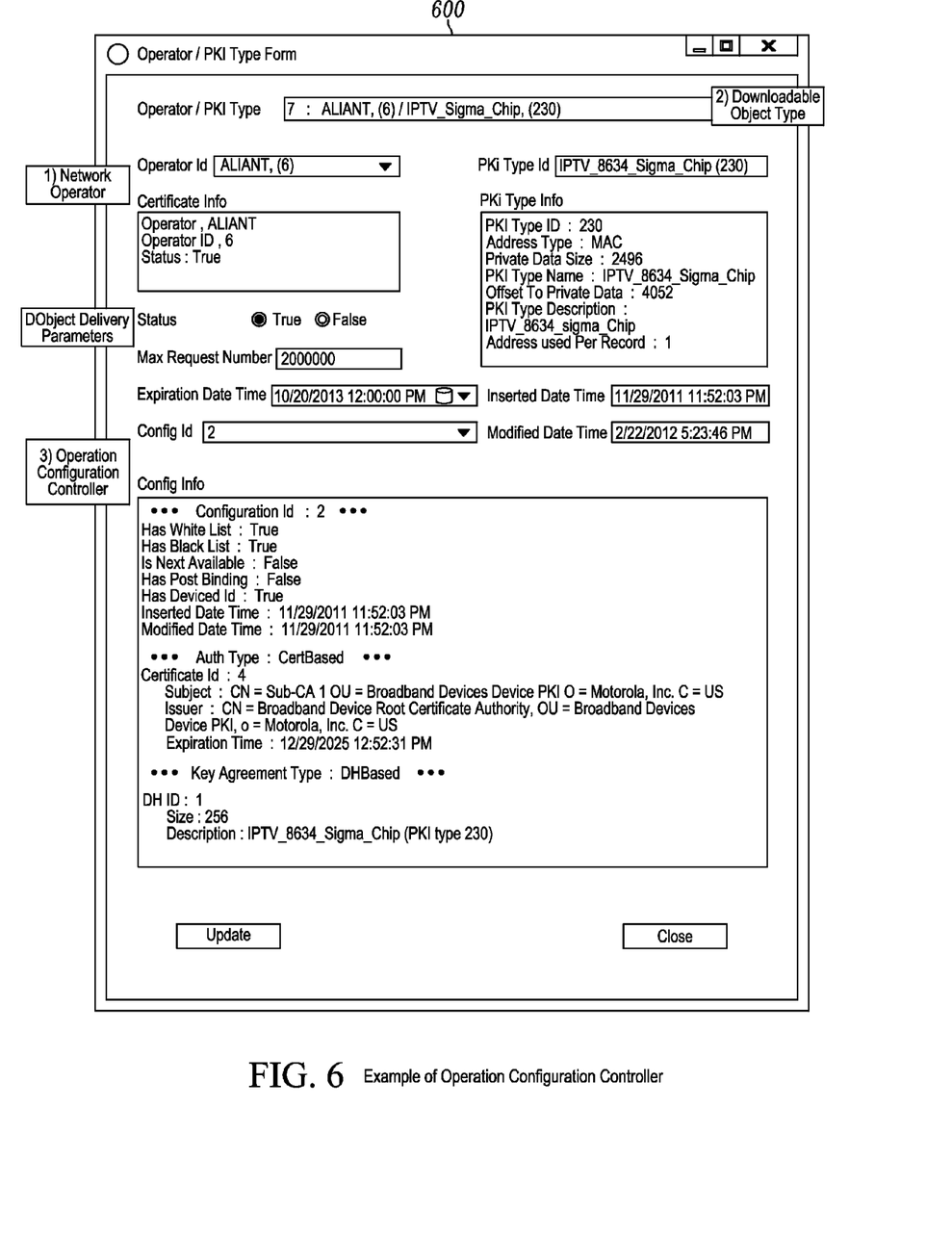

FIG. 6 shows a download process creator (DPC) screen 600, which provides fields which are used to define a download process for a network operator. The DPC screen allows the administrator to assign a download process ID (designated in FIG. 6 as the operator/PKI type field), which is used to associate a network operator with a particular process configuration and a particular data object type. In this example, the operator/PKI type ID is 7, which ties the network operator Aliant (6) to an operation configuration (Config ID) designated as 2 and a data object type designated as IPTV_8634 SigmaChip (230).

After a specific download process is defined, additional parameters for this download process can also be configured by populating the additional fields shown in FIG. 6. For instance, the field denoted Max Request Number allows a maximum number of repeated requests for a data object from a specific device. This parameter is configurable for a specific download per network operator and per each data object type. The server checks if the number of repeated requests is less than the amount specified in this field. The purpose of this check is to ensure that the server can stop responding to a rogue device that repeatedly sends new data object requests to the update server. In the example shown in FIG. 6, the maximum number of requests from Aliant devices downloading the data object type 230 is 2 million.

FIG. 6 also shows a field denoted Expiration Date Time, which is the time after which the update server does not allow any data objects to be downloaded for a specific operator and a specific data object type. In the example shown in FIG. 6, the update server does not allow Aliant devices to download data objects of type 230 after Oct. 20, 2013.

The DPC screen allows the system administrator to define a download process by linking a network operator and data object type with a process configuration. For example, Table 1 shows process configuration parameters for a number of network operators. As shown, Comcast (with the network operator ID 1) and Aliant (ID=6) both download the same data object type (type ID=200), as indicated by the Download Process (DP) IDs 1 and 6. Also, two network operators (i.e. Aliant with the network operator ID equal to 6 and Sasktel with the network operator ID equal to 7) may share the same operation configuration (configuration ID=2) for downloading different data object types (i.e. 200 and 230) as indicated by DP IDs 7 and 8. All of the information shown in Table 1 is stored in the database 140.

TABLE 1

Download Process Configuration Parameters

| DP ID | Network Operator ID | DObject Type | Configuration ID |
|---|---|---|---|
| 1 | Comcast (1) | 200 | 1 |
| ... | ... | ... | ... |
| 6 | Aliant (6) | 200 | 1 |
| 7 | Aliant (6) | 230 | 2 |
| 8 | Sasktel (7) | 200 | 2 |

Online Request and Response Process

Figure 7:
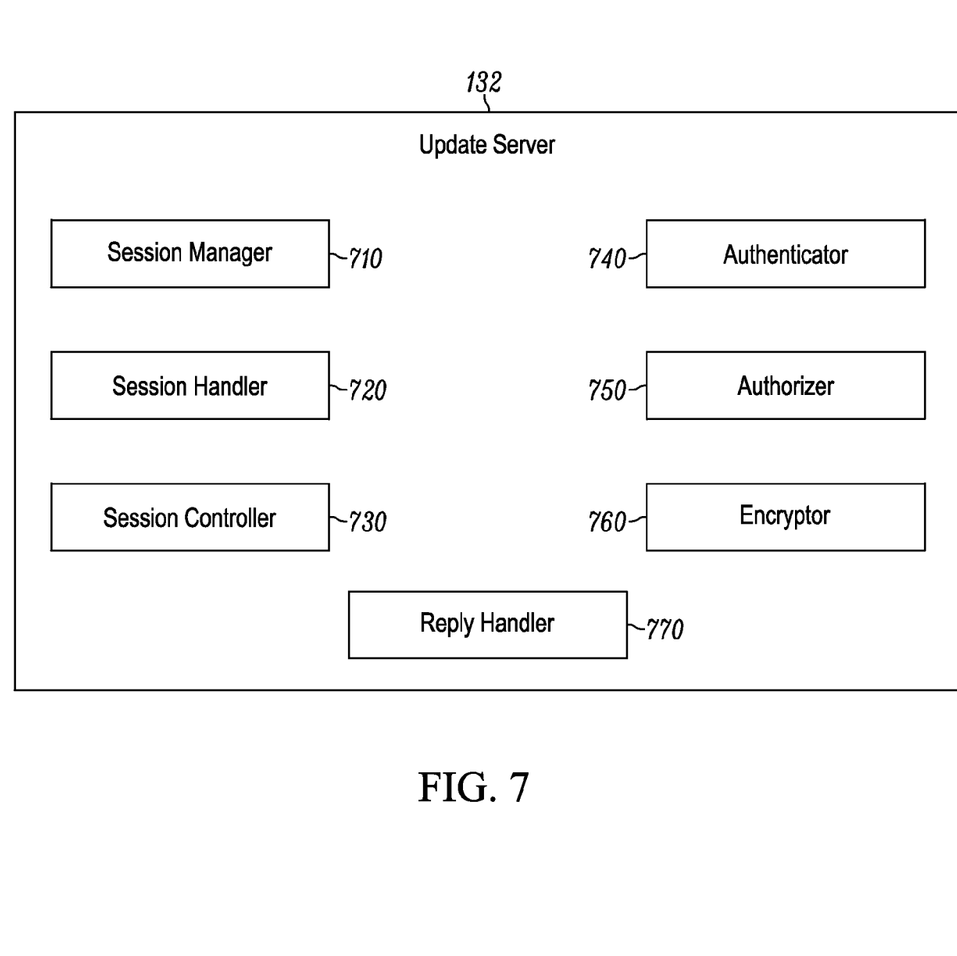
FIG. 7 shows a high level architecture of one example of the update server.

FIG. 7 shows a high level architecture of one example of the update server 132. As shown, update server 132 includes a session manager 710, a request handler 720, an operation controller 730, an authenticator 740, an authorizer 750, and encryptor 760 and a reply handler 770.

Figure 8:
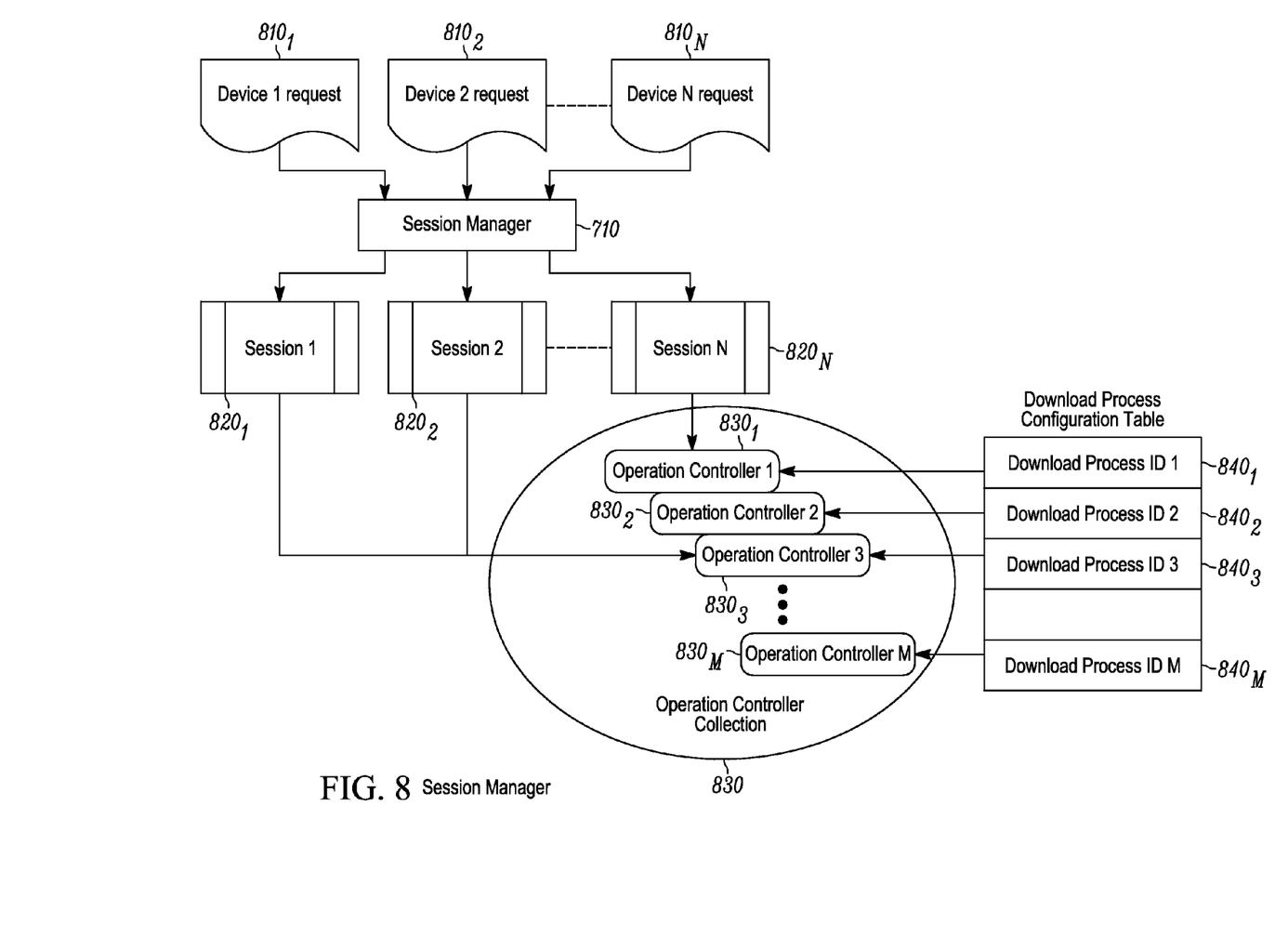
FIG. 8 shows a series of logical operations performed by the session manager in the update server.

When a download request is received by the update server from a network-enabled device, the session manager 710 creates a new session to handle the request. As shown in the example of FIG. 8, requests $810_1$, $810_2$ ... and $810_N$ are received by the session manager 710 from three different network-enabled devices. The session manager 710 creates N sessions with each representing a separate thread. The session manager 710 chooses from a collection of operation controllers 830. Each individual operation controller $830_1$, $830_2$, $830_3$ ... $830_M$ corresponds to a respective download process ID $840_1$, $840_2$, $840_3$ ... $840_M$, based on the download process configuration table (shown in Table 1), and performs request message processing and response message generation. Since the update server simultaneously supports different download processes used by different operators for various downloadable object types, the server loads multiple operation controller objects each corresponding to a particular download process. When the download process creator (DPC) creates a new download process it triggers a new operation controller to be added to the update server without having to restart the server.

Figure 9:
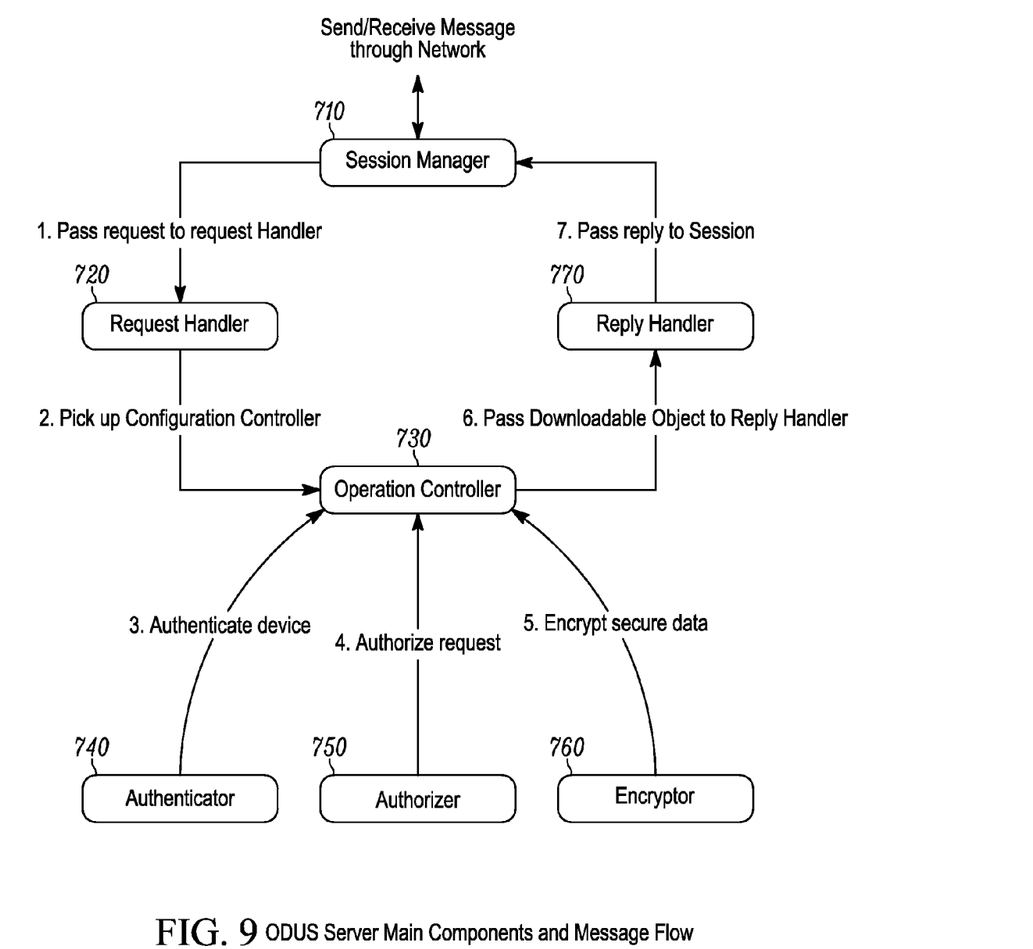
FIG. 9 shows one example of the internal message flow between the primary components of the update server.

The manner in which the components of the update server shown in FIG. 7 interact with one another is shown in the process flow of FIG. 9. The session manager 710 handles the exchange of request and response messages with requesting network-enabled devices and records the request messages in the database 140. The session manager 710 also handles errors and records error messages in the database 140. As indicated by message 1, the session manager 710 passes the received request message to the request handler 720. The request handler 720 parses and validates device request messages. It also interfaces with the operation controller 730 to process the request message. As indicated by message 2, the request handler 720 selects a download process configuration by identifying the DP ID based on information received (i.e., the operator ID and data object type) in the request message.

The operation controller 730 provides the methods for the authentication and authorization of request messages and performs the encryption operations on the data objects retrieved from the database, which is packaged in the response message by the reply handler 770. There is a one-to-one correspondence between an operation and a DP ID. The operation controller 730 uses the DP ID determined by the request handler 720 to retrieve the Configuration ID, which in turn determines which type of authenticator 740, authorizer 750 and encryptor 760 are to be used for each request.

Since there are various mechanisms that may be used to authenticate a download request message received from a network-enabled device, different types of authenticators 740 are implemented in the update server. The configuration ID specifies the authentication mechanism and its associated parameters for a specific download process. The operation controller 730 then communicates with the corresponding authenticator, as indicated by message 3, and loads the parameter values for use. For example, if the configuration ID indicates that a PKI-based mechanism is to be used, the operation controller 730 will use a PKI authenticator and retrieve the specified Sub CA, Root CA, and Certificate Revocation Lists (CRL) from the database 140. An example of the authenticator workflow is discussed below in connection with FIG. 10.

As mentioned above, a white list or black list can be used to ensure that only authorized devices selected from among all the authenticated devices are allowed to be provisioned with new data objects. The whitelist/blacklist is imported to the database 140 via the data loading application 133 (see FIG. 1). If no white or black list is provided, the update server allows all authenticated devices to download the requested data object. The access to a data object is checked by the authorizer 750 by using the Configuration ID to determine whether a whitelist or a black list is specified in order to determine whether a request from the device should be granted or rejected when the device ID is already stored in the database 140 and linked to a white or black list. When the request is authorized, the authorizer 750 retrieves the data object from the database 140 and returns it to the operation controller 730, as indicated by message 4. An example of the authorizer workflow for a whitelist-based authorization mechanism is discussed below in connection with FIG. 11.

Similar to the authenticator 740, since there are various mechanisms that may be used to protect a data object, different types of encryptors may be implemented in the update server. The Configuration ID specifies the encryption mechanism and its associated parameters for a specific download process. The operation controller 730 then uses the corresponding encryptor 760 and loads onto it the parameter values that are to be used. For example, if the configuration indicates that a Diffie-Hellman-based mechanism is to be used, the operation controller 730 uses a DH encryptor and retrieves the specific DH system parameters (base g and modulus n) from the database 140. As indicated by message 5, the operation controller 730 receives the encrypted data object from the encryptor 760. An example of the DH-based encryptor workflow is discussed below in connection with FIG. 12.

The reply handler 770 receives the encrypted data object from the operation controller 730, as indicated by message 6. The reply handler 770 packages the response message in accordance with an appropriate system protocol and sends it to the session manager 710, as indicated by message 7.

Figure 10:
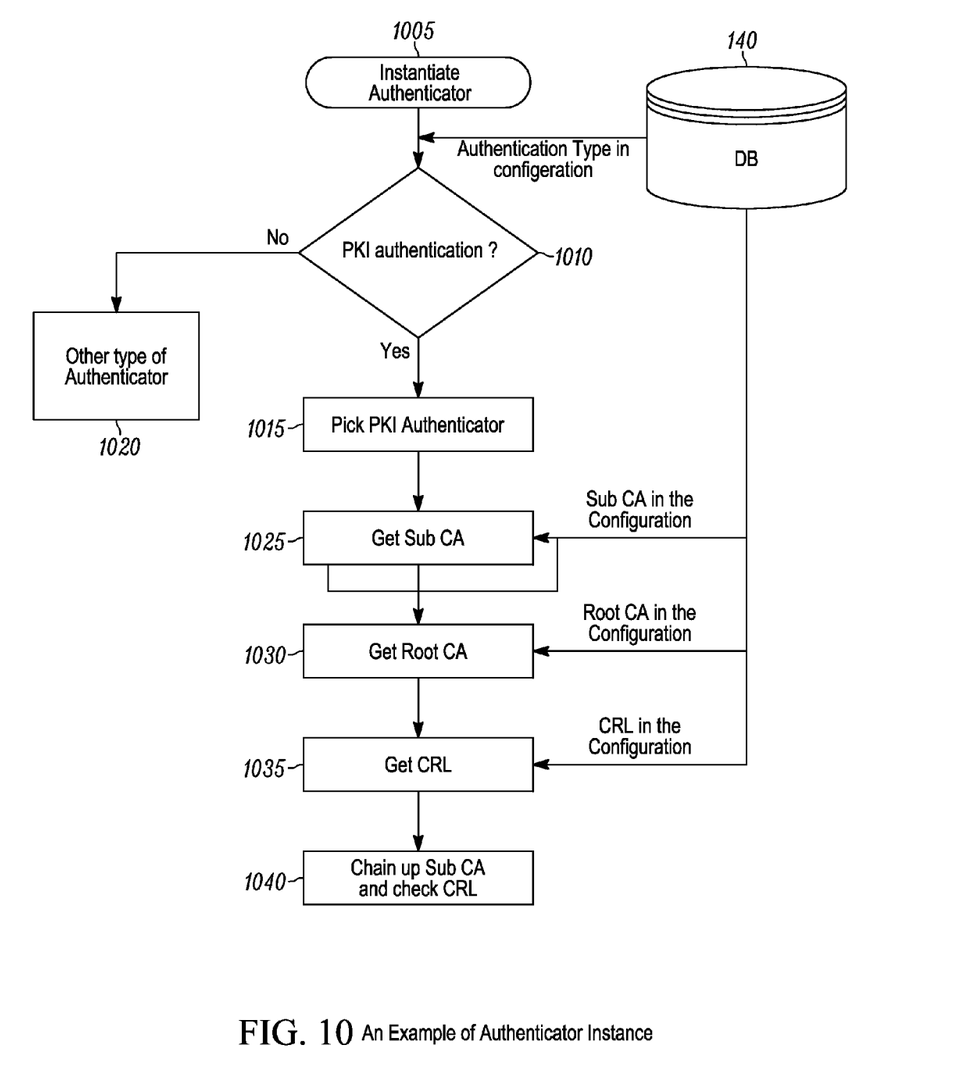
FIG. 10 shows one example of the authenticator workflow for a particular configuration ID that is stored in the system database.

FIG. 10 shows one example of the authenticator workflow for a particular configuration ID that is stored in database 140. The process begins at step 1005, where the operation controller 730 instantiates an authenticator based on the authentication type to be employed for the configuration ID, which is obtained from database 140. At decision step 1010 the operation controller determines if PKI authentication is to be employed. If so, the process proceeds to step 1015, where the operation controller selects the PKI authenticator. If PKI authentication is not to be employed, the process proceeds to step 1020, where the appropriate authenticator is selected. Assuming a PKI authenticator is to be employed, the process obtains the sub CA, root CA and the CRL from the database 140 at steps 1025, 1030 and 1035, respectively. Finally, at step 1040 the PKI authenticator compares the chain of certificates to the chain included in a request from a network-enabled device in order to determine whether the request is to be authenticated.

Figure 11:
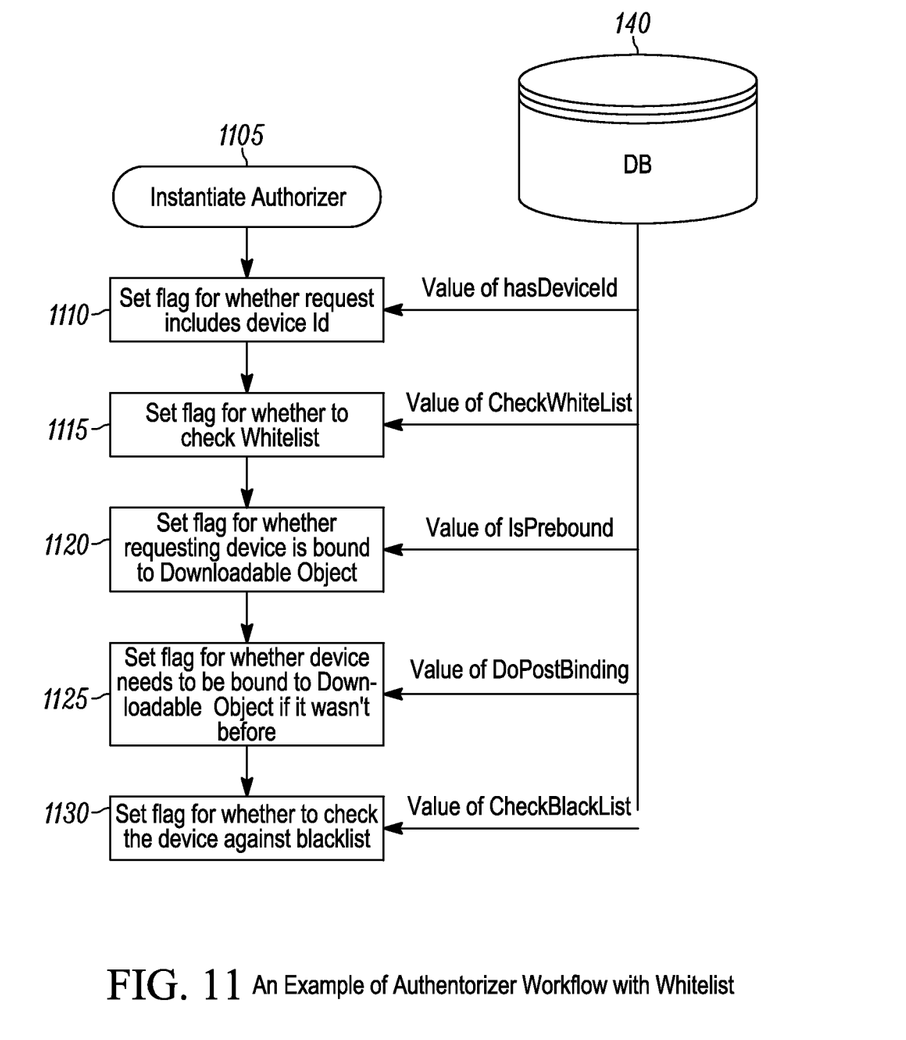
FIG. 11 shows one example of a method for configuring the authorizer for a particular configuration ID that is stored in the system database.

FIG. 11 shows one example of a method for configuring the authorizer for a particular configuration ID that is stored in database 140. The method begins at step 1105 where the authorizer is instantiated by the operation controller 730. The authorizer is configured by setting various flags based on the authorization parameters obtained from the database 140 for this particular configuration ID. In particular, at step 1110 a flag is set if a request from a network-enabled device is to include a device ID. At step 1115 a flag is set if the device sending the request is to be compared to a whitelist of devices that are authorized to receive data objects. At step 1120 a flag is set if the device sending the request is to be bound to the data object at the time of generation. that is downloaded. At step 1125 a flag is set if the device sending the request is to be bound to the data object after it is downloaded to the device. At step 1130 a flag is set if the device sending the request is to be compared to a blacklist of devices that are not authorized to receive data objects.

Figure 12:
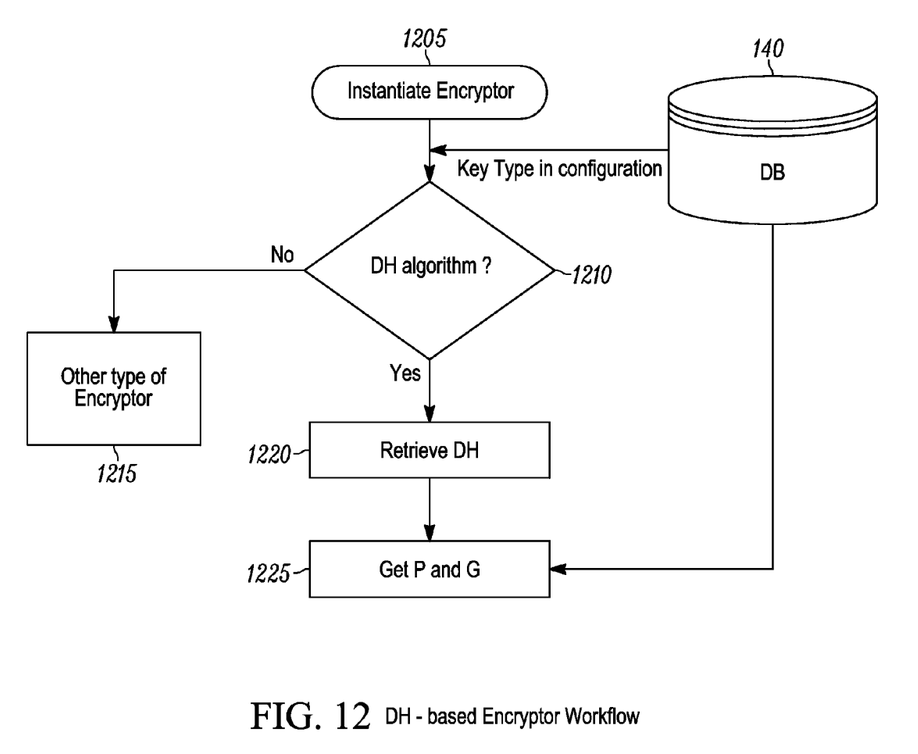
FIG. 12 shows one example of a DH-based encryptor workflow for a particular configuration ID that is stored in the system database.

FIG. 12 shows an example of the DH-based encryptor workflow. The method begins at step 1205 where the encryptor is instantiated by the operation controller 730. The encryptor is configured based on the key type that is to be used, which is obtained from the database 140 for this particular configuration ID. At decision step 1210 the operation controller determines if a DH algorithm is to be employed. If not, at step 1215 the operation controller selects another encryptor as specified by the information obtained from the database 140. If on the other hand a DH algorithm is to be employed, the method proceeds to step 1220 where the DH algorithm is retrieved. At step 1225 the encryptor retrieves the system parameters P and G from the database 140 in order to determine the encryption key that is to be used to encrypt the download object.

As used in this application, the terms "component," "module," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a processor to implement the disclosed subject matter. The term "article of manufacture" as used herein is intended to encompass a computer program accessible from any computer-readable device, carrier, or media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). A processor may be used to execute instructions encoded by the computer-readable storage media. Of course, those skilled in the art will recognize many modifications may be made to this configuration without departing from the scope or spirit of the claimed subject matter.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims—and their equivalents—in which all terms are mean in their broadest reasonable sense unless otherwise indicated.

The invention claimed is:

1. A remote update server system for downloading Public Key Infrastructure (PKI) data objects to network-enabled video playing devices, the remote update server including a processor and memory, the memory storing code readable by the processor so that the processor forms components comprising:

an identity data generator configured to generate a plurality of new downloadable PKI data objects providing specific device identifiers, the identity data generator connected to Hardware Security Modules (HSMs) in which private keys and secure data are stored for use in generation of the PKI data objects;

a whitelist or blacklist manager configured to (i) receive one or more identifiers associated with each of a plurality of network-enabled video player devices deployed for use in association with a network, (ii) consolidate various identities from white or blacklist sources for a network of devices, and (iii) produce a whitelist or blacklist relating the one or more identifiers to each of the network-enabled video player devices that are respectively authorized or unauthorized to receive new downloadable PKI data objects to enable access to videos from the network;

a data loading application in communication with the whitelist/blacklist manager and identity data manager which loads the downloadable PKI data objects to the database for access;

an update server configured to (i) receive the new downloadable PKI data objects from the data loading application, (ii) receive requests for new downloadable PKI data objects from the plurality of network-enabled video player devices (iii) authenticate each of the network-enabled video playing devices and (iv); deliver a new downloadable PKI data object to each one of the authenticated network-enabled video playing devices that are authorized to receive a new downloadable PKI data object to enable access to videos from the network in accordance with the whitelist or blacklist; and a configuration manager providing a user interface (UI) through which a plurality of parameters associated with new downloadable PKI data objects to be downloaded to a plurality of network-enabled video player devices are configurable, the plurality of parameters including a first parameter specifying a process configuration identifier identifying a group of configurable parameters included in the plurality of parameters which collectively specify one or more operations that are employed to process the request.

2. The system of claim 1 wherein the group of configuration parameters includes a second parameter specifying a download process identifier associating the process configuration identifier with a particular network operator.

3. The system of claim 1 wherein the group of configuration parameters further comprises:

a second parameter specifying PKI data object being the type of new downloadable data objects to be generated;

a third parameter specifying a device identity type to be used to authorize a request for downloadable PKI data objects, a fourth parameter specifying an authentication mechanism to be used to authenticate the request, a fifth parameter specifying a device identity to be associated with a new downloadable PKI data object, a sixth parameter specifying a protection mechanism to be used for securely delivering new downloadable PKI data objects to the network-enabled video player devices, a seventh parameter specifying a number of times the network-enabled video player device is able to download a new downloadable PKI data object, and an eighth parameter specifying a time after which a new downloadable PKI data object is no longer downloadable to the network-enabled video player device.

4. The system of claim 1 further comprising a second parameter specifying a network operator identifier identifying a network operator associated with a plurality of the network-enabled video player devices.

5. The system of claim 1 further comprising a second parameter specifying a manner in which new downloadable objects are associated with network-enabled video player devices.

6. The system of claim 5 wherein the second parameter specifies whether a particular downloadable PKI data object is generated for a particular one of the network-enabled video player devices by associating the particular downloadable PKI data object with a previously assigned identifier identifying the particular network-enabled video player device, or whether a particular downloadable PKI data object generated without being associated with the particular network-enabled video player device is associated with the particular network-enabled video player device when a request is received from the particular network-enabled video player device.

7. The system of claim 6 further comprising a third parameter specifying whether the particular downloadable PKI data object is permanently bound to the particular device when a particular downloadable PKI data object is associated with the particular network-enabled video player device when a request is received.

8. The system of claim 6 further comprising a third parameter specifying whether the particular downloadable PKI data object is associated with a particular network-enabled video player device without being permanently bound thereto.

9. The system of claim 6 further comprising a third parameter specifying whether the particular downloadable PKI data object is unassociated with a one of the particular network-enabled video player devices.

10. The system of claim 2 wherein the update server includes:
- a session manager for communicating with the network-enabled video player devices and creating a new session for each new request that is received;
- a request handler for parsing and validating the new requests;
- a plurality of operational controllers each corresponding to a different download process identifier, the request handler being configured to select one of the operation controllers for each session that is created based on information included in the new requests respectively associated with each session, the operation controllers selecting methods for authentication, authorization and encryption to be used in processing each of the new requests based on values for parameters in the group of parameters that are specified for each new request.

* * * * *